United States Patent [19]

Musick et al.

[11] Patent Number: 4,517,929

[45] Date of Patent: May 21, 1985

[54] SELF-ADJUSTING COOLING SYSTEM FOR DIESEL ENGINES

[75] Inventors: Donald R. Musick, Fort Wayne, Ind.; Edward H. Howell, Moreland Hills, Ohio

[73] Assignee: International Harvester Company, Chicago, Ill.

[21] Appl. No.: 535,197

[22] Filed: Sep. 23, 1983

[51] Int. Cl.³ ............................................. F01P 3/12
[52] U.S. Cl. ................................. 123/41.1; 60/599; 123/41.31
[58] Field of Search ............ 123/41.31, 41.33, 41.08, 123/41.09, 41.1; 60/599

[56] References Cited

U.S. PATENT DOCUMENTS

| | | | |
|---|---|---|---|
| 2,841,127 | 7/1958 | Baster | 123/41.1 |
| 3,134,371 | 5/1964 | Crooks | 123/41.31 |
| 4,325,219 | 4/1982 | Stang et al. | 60/599 |
| 4,348,991 | 9/1982 | Stang et al. | 123/41.29 |

Primary Examiner—William A. Cuchlinski, Jr.
Attorney, Agent, or Firm—Boris Parad; Dennis K. Sullivan; F. David AuBuchon

[57] ABSTRACT

A self-adjusting cooling system for an internal combustion engine comprising a first circuit re-circulating a larger fluid flow, and excluding the radiator, and a second circuit re-circulating a smaller amount of fluid which passes through the radiator. Three valve control system automatically re-routes the coolant fluid with the lowest temperature in either circuits, or a mixture of fluids in these circuits, into an aftercooler for cooling the air entering the engine.

11 Claims, 4 Drawing Figures

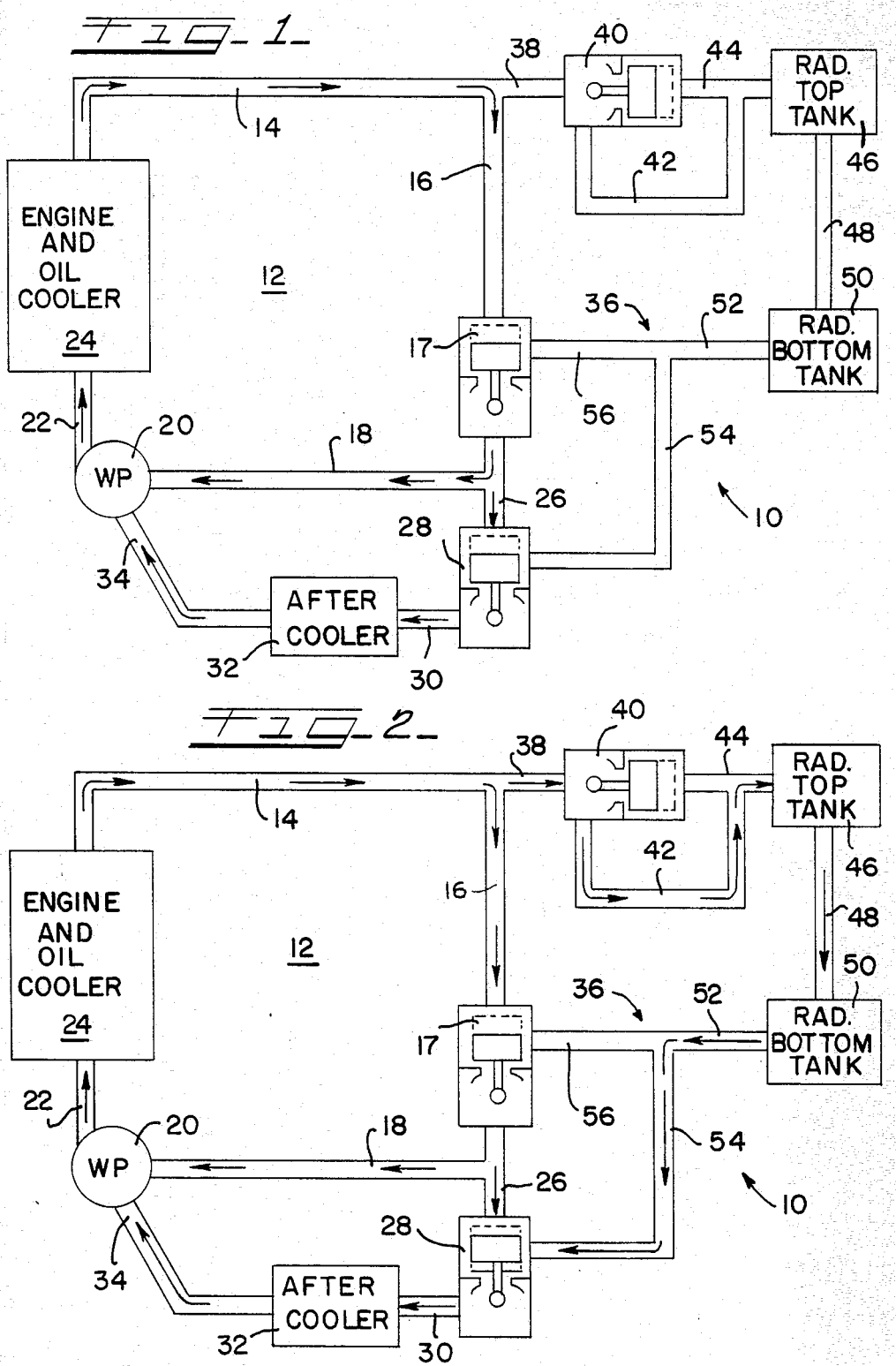

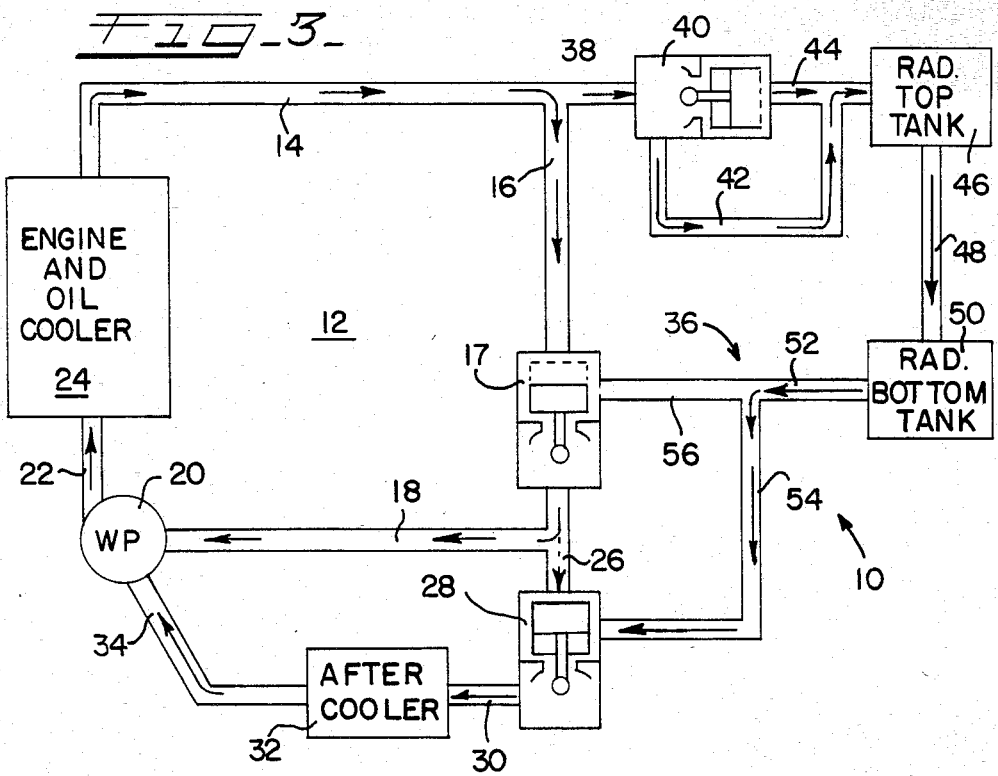
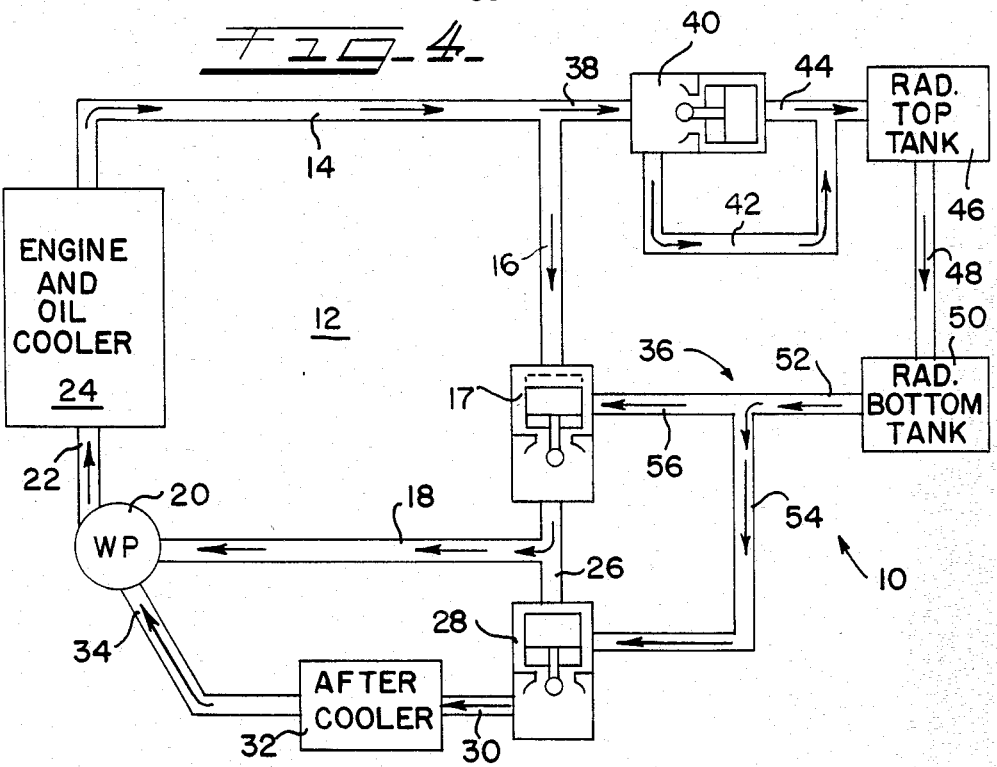

SELF-ADJUSTING COOLING SYSTEM FOR DIESEL ENGINES

BACKGROUND OF THE INVENTION

1. Field of the Invention

This invention pertains to cooling systems for internal combustion engines, and more particularly for self-adjusting cooling systems for supercharged diesel engines.

2. Information Disclosure Statement

Heretofore, numerous attempts have been made to design cooling systems including means to cause a large recirculating flow through the jacket of the engine. These systems used dual coolant circuits. The U.S. Pat. Nos. 4,348,991; 3,134,371; and 2,841,127 exemplify the existing cooling systems of this kind.

The efficiency of an internal combustion engine can be improved by carefully controlling the operating temperature of the engine and the air charge supplied thereto. The temperature control is also important to the abatement of certain types of undesired emissions. However, the ideal temperature of achieving maximum efficiency as well as emission abatement is not the same for all operating conditions of the engine nor is it the same for all engine components and air charge. If the engine is turbocharged, then an aftercooler is employed for reducing the discharge air temperature of the compressor. Such aftercoolers normally use an engine coolant as a recipient heat transfer medium. In the normal single circuit-type cooling system, the coolant is often not below approximately 170° F. at the coolest point in the circuit after the engine has reached its normal operating temperature. Such a temperature is not sufficiently low for an ideal aftercooler operation under certain engine operating conditions. Therefore, if the coolant supplied to the aftercooler could be reduced in temperature, further improvement in engine efficiency would be achieved. Engine cooling systems, such as disclosed in the U.S. Pat. Nos. 4,061,187 to Rajasekaran et al.; 3,872,835 to Deutschmann, disclose coolant circuits allowing one circuit to operate at a higher temperature than does the other. Dual coolant circuit systems solve the problem associated with the need to provide both high and low temperature coolant to different components of an engine.

Previously disclosed designs of cooling systems teach a generally fixed percentage of the recirculatory flow which is split off and passed through a radiator. Then the now cooled coolant from the radiator is passed through an after-cooler which is used to cool the air being blown into the engine. The coolant exiting from the aftercoolers is still at a lower temperature than the recirculatory flow and can be sent back into the main recirculatory flow to cool the engine.

However, none of the references of record describes, illustrates or teaches the novel self-adjusting cooling system for a low temperature air cooling of liquid aftercooled diesel engines as disclosed in the below described subject invention.

SUMMARY OF THE INVENTION

According to the present invention, a self-adjusting cooling system for cooling air passing through an internal combustion engine comprises two coolant circuits. The first coolant circuit circulates the fluid through the engine with a branch line passing through an aftercooler. The second coolant circuit passes through a radiator and couples with the first circuit under the predetermined conditions. Thermally controlled valve means sequentially and automatically self-engage in response to an engine temperature rise for re-routing the cooling fluid with the lowest temperature in either of two circuits or a mixture thereof into the aftercooler of the engine.

BRIEF DESCRIPTION OF THE DRAWINGS

FIG. 1 is a schematic illustration of a self-adjusting cooling system in an initial stage of the engine warm-up;

FIG. 2 is a diagram shown in FIG. 1 indicating the flow of fluid in the final stage of the the engine warm-up;

FIG. 3 is a diagram shown in FIG. 1 illustrating the fluid path during the engine normal operation;

FIG. 4 is a diagram shown in FIG. 1 illustrating the fluid path in the cooling system while the engine operates under the most adverse conditions.

DESCRIPTION OF THE PREFERRED EMBODIMENT

The invention may be carried into practice in a number of ways but one specific embodiment will be described by way of example only.

Referring now to the drawings wherein reference characters designate like or corresponding parts throughout the several views, there is shown in FIGS. 1-4 a self-adjusting cooling system 10 for a low temperature charge air cooling of the liquid aftercooled internal combustion engines. The system is to be used with diesel engines of various manufacturers as the means to improve fuel economy and reduce detrimental emissions. The cooling system 10 comprises a first coolant circuit 12 providing a large re-circulating flow of cooling fluid. The fluid flows through the circuit 12 via a supply line 14 into the line 16, then passes a thermally controlled valve 17 located on the line 16 and turns into a water pump induction line 18 connected with the pump 20. The pump outlet line 22 leads to the engine and oil cooler 24. The circuit 12 also includes a branch line 26 which is plugged into a thermally controlled mixing valve 28. The mixing valve 28 controls an admission of the fluid through the line 30, into the aftercooler 32. The fluid leaving the aftercooler 32 returns to the water pump 20, thus joining the line 18.

A second coolant circuit 36 re-circulating a smaller flow of coolant fluid begins from a line 38 which is extended from the first circuit supply line 14 and diverging from the line 18. From the line 38 the fluid is admitted into a thermally controlled valve 40, which has a by-pass line 42. The diameter of the by-pass line 42 is selected to restrict the fluid flow rate to approximately 5 gpm. A line 44 carrying the fluid from the valve 40 into a radiator top tank 46 joins the by-pass line 42 before entering the radiator top tank 46. From the top tank 46 the fluid descends through the radiator 48 into the radiator bottom tank 50. The fluid cooled in the radiator 48 and emanating from the tank 50 moves through the line 52 and then splits into two diverging conduits 54 and 56. The conduit 54 leads to the mixing valve 28 and the conduit 56 is connected to the relief valve 17.

The cooling system 10 provides a low temperature charge air cooling over a wide range of typical operating conditions which adjusts itself to maintain engine cooling during the most adverse operating conditions. The most adverse conditions occur when the engine is under full load at high ambient temperature and low vehicle speed. The subject system controls the supply of a relatively low temperature coolant to the engine aftercooler for all except the most severe operating conditions. It is easily adaptable by any engine manufacturer because it requires minor modifications which significantly improve fuel economy and reduction of undesired emissions.

The system 10 comprises thermally controlled valves 17, 28 and 40, which sequentially and automatically self-engage in response to an engine temperature rise for re-routing the coolest fluid from either of both circuits or a mixture thereof into the engine aftercooler. The thermally controlled valves let the fluid enter through their first port in its closed position. This port begins to close and a second one opens in response to pre-set fluid temperature limits, thereby completely closing the first port in its open position.

In this particular embodiment an engine heat rejection, including that one which is rejected (generated) by the aftercooler and engine oil cooler is about 8,000 btu/min and the coolant flow rate through the engine is a constant 100 gpm. The coolant used is a 50/50 mixture of ethylene glycol and water. The cooling system has been sized to dissipate 8,000 btu/min without exceeding 212° F. Coolant flow rate through the engine aftercooler shall be no less than 5 gpm, but no more than 15 gpm, even during the engine warm-up. Another desirable requirement is that coolant outlet temperature from the engine must be brought to 180° F. as quickly as possible during the warm-up, and it must not fall significantly below 180° F. during the normal operation.

As depicted in FIG. 1, at the initial stage of the engine warm-up all three thermostatically controlled valves 17, 28 and 40 are closed, thereby blocking the coolant flow through the radiator 48. In other words, the second coolant circuit 36 is closed and the fluid passes through the closed valves 17, 28 and aftercooler 32 moving toward the pump 20 being unaffected by the radiator cooling. Charged air passing through the aftercooler will be warmed by the coolant depending on the ambient temperature. Since there is no flow through the radiator the rate of the warm-up significantly accelerates. This warm-up stage continues until the engine outlet temperature reaches 120° F.

The final stage of the engine warm-up ranges from 120° F. to approximately 180° F. of the engine outlet temperature. The fluid flow path, as illustrated in FIG. 2, at this stage is changed to allow about 5 gpm of the coolant to flow through the by-pass loop line 42 of the valve 40, which is still closed, and through the radiator 48. These five gpm of coolant, which should be the maximum passing capacity of the by-pass line 42, flow through the radiator 48 and, thereafter, the mixing valve 28 because the valve 28 slightly opens at 120° F. During this mode, an engine warm-up rate depends upon the engine heat rejection to the coolant. The warm-up from 120° F. to 180° F. occurs when the heat rejection is sufficient to cause a 60° F. temperature drop across the radiator 48 at the flow rate of 5 gpm. A heat rejection to the coolant of 2190 btu/min is sufficient to cause a 60° F. temperature drop, which is only 27 percent of the full heat rejection of 8000 btu/min, as mentioned earlier. At 2190 btu/min heat rejection rate the engine outlet temperature warms to 180° F. while the radiator bottom tank temperature reaches 120° F. If the heat rejection to coolant were less than 2190 btu/min, the engine outlet temperature would not reach 180° F. but would warm to a lower temperature. For example, a heat rejection of only 1000 btu/min. would cause the temperature to drop off only 27° F. instead of 60° F., so the engine outlet temperature would only reach 147° F. During the final stage of the warm-up the valves 40 and 17 are still closed and the valve 28 is slightly open at a predetermined temperature 120° F., thereby permitting only a limited flow of 5 gpm to pass through the radiator 48 into the aftercooler 32.

During the engine normal operation the engine outlet temperature is fluctuating in the range of 180° F. to 200° F. The coolant flow path for the engine normal operation mode is illustrated in FIG. 3. When the engine outlet temperature exceeds 180° F., the thermostat or valve 40 opens. The coolant flow rate through the radiator 48 and aftercooler 32 is limited to 15 gpm by a sizing of the aftercooler supply line 30, which permits only 15 gpm to flow therethrough. The coolant temperature is maintained at about 120° F. in the aftercooler supply line 30 by bringing together the coolant fluids from the first and second circuits. Engine outlet temperature at full engine power (8000 btu/min) would be at 193° F., if the vehicle speed was high enough and an ambient temperature was low enough so that all of the heat could be dissipated at a coolant flow rate of 15 gpm. As envisioned in this particular embodiment, the cooling system will maintain the coolant temperature below 212° F. when the valve 17 is completely closed, provided that the ambient temperature does not exceed 86° F. Correspondingly, at the engine full power and 15 mph vehicle speed the engine outlet temperature will not exceed 193° F., as long as the ambient temperature is 67° F. or below. Considering the fact that the annual median temperature in the United States is 58° F. and the ram air flow improves cooling performance at the highway speeds, the engine outlet temperature usually varies between 180° F. and 193° F. Hence, the coolant inlet temperature in the line 30 can usually be maintained at 120° F. If the coolant temperature drops below 180° F., the valve 40 automatically closes, thereby restricting the radiator flow back to 5 gpm. The engine outlet temperatures above 193° F. but below 200° F. can be reached only intermittently if at all, during the normal highway operation even on a hot day. Under this condition the coolant temperature in the aftercooler inlet line 30 would be increased to temperatures between 120° F. and 127° F., assuming that the full engine power was utilized.

In the engine warm-up mode the coolant cannot move through the by-pass line 42, because the valve 17 and mixing valve 28 are closed until the engine outlet temperature reaches 120° F. When the temperature exceeds 120° F. the valve 28 slightly opens and the by-pass line 42 allows 5 gpm to move therethrough. Thus, in the temperature range 120°–180° F. the mixing valve 28 blends both first and second circuit fluids, thereby maintaining 120° F. temperature in the inlet line 30 by mixing the first circuit coolant flow (temperature of about 175° F.) coming through the line 26 and the radiator outlet fluid flow coming through the conduit 54. In the normal mode of the engine operation the flow through the first circuit line 26 is blocked by the valve 28 when the temperature reaches 140° F. This is because the valve 28 operates in the range of 120°–140° F., i.e. opens at 120° F. and closes at 140° F. When the temperature reaches 180° F. the valve 40 begins to open, so that the flow from the first circuit supply line 14 can move through the line 38 into the valve 40. But the aftercooler supply line 30 can pass a maximum of 15 gpm thereby controlling the maximum flow rate through the radiator 48. Thus, the valve 40 permits the incremental or multi-stage flow rate control from 5 gpm (restricted by the sizing of the by-pass 42) to 15 gpm (restricted by the sizing of the line 30). Conversely, when the temperature drops below 180° F., the valve 40 will permit only 5 gpm to pass through the radiator 48. Since the valve 28 closes the flow coming through the first circuit via the line 26 at 140° F., the 15 gpm flow reaches the aftercooler through the line 30 from the radiator bottom tank 50 containing the coolant fluid with the lowest temperature possible in the second circuit 36.

When the engine operates under the most adverse conditions, the fluid flow path is shown in FIG. 4, the engine outlet temperature exceeds 200° F. As the temperature in the first circuit exceeds 200° F., the valve 17 begins to open, allowing the coolant flow from the radiator 48 to gradually increase from 15 gpm up to 85 gpm. The conduit 56 carries about 70 gpm which is returned to the engine directly and 15 gpm passes through the conduit 54 into the aftercooler 32 before returning to the engine 24. The valve 17 opens only during the most adverse conditions, allowing the first circuit fluid flow of coolant to move through the radiator 48, which is highly undesirable in the normal engine operation. The valve 17 serves as a safety valve permitting the larger re-ciculating fluid flow to move through the radiator 48. The fluid flow in the first circuit line 16 is blocked by the fully open valve 17 and the coolant temperature in the first circuit supply line 14 should not exceed 213° F. This can be achieved by a proper radiator sizing. Even if the temperature exceeds 200° F., the aftercooler 32 still gets only 15 gpm and the coolest fluid possible under circumstances, because it is not mixed with the main or first circuit hot temperature fluid. The first circuit flow is shut off from entering the aftercooler 32 by the mixing valve 28 which cuts off the first circuit line 26 at 140° F.

The engine coolant outlet temperature at the engine full power (8000 btu/min) will not exceed 212° F., if the cooling system has been properly designed for the "worse case" conditions including the engine full power, 15 mph vehicle speed and 113° F. ambient temperature at the coolant flow rate through the radiator of 85 gpm. During this extremely adverse combination of conditions, when the capacity of the cooling system is strained to the limit and the engine outlet temperature approaches 212° F., the temperature of the coolant entering the aftercooler 32 is about 200° F. and the coolant flow rate through the radiator 48 is 85 gpm. However, when the engine coolant outlet temperature is below or at 200° F. and the control valve 17 has not yet opened, the temperature of the coolant entering the aftercooler is about 127° F. at the engine full load and the coolant flow rate circulating through the radiator 48 is only 15 gpm. As the safety valve 17 allows the passage of just enough coolant to control the first circuit temperature between 200° F. (the flow rate of 15 gpm) and 212° F. (85 gpm), thereby the temperature of the coolant entering the aftercooler will be controlled between 127° F. (15 gpm) and 200° F. (85 gpm).

By adopting the self-adjusting cooling system, the fuel economy and reduction of emissions can be easily achieved by making only minor modifications to the presently used "full flow" cooling systems. No new radiators are required and all the features of the valve control system can be installed in a reasonable space on the engine, while retaining existing sizes and locations for the engine inlet and outlet connections. The self-adjusting system automatically regulating the flow through either or both circuits by three control valves achieves the maximum cooling effect by coupling to or, if necessary, separating a lower volume second circuit with coolest fluid from the hot first circuit, which recirculates a larger volume of coolant. Thus the need for an increased sizing of the heat dissipating structures like a radiator, fan, etc. is eliminated.

Another very important feature of this sytem is its ability to automatically adjust to all operating conditions like lower outside temperature or a partially loaded engine or higher road speeds to select the most efficient operation of the system. The self-adjusting system can be easily assembled and applied to the existing systems with minimum expenses.

While one embodiment of the invention has been illustrated and described herein, various changes and modifications may be made therein without departing from the spirit of the invention as defined by the scope of the appended claims.

What is claimed is:

1. A method of reducing the temperature of a cooling fluid passing through an aftercooler for cooling the air supplied to an internal combustion engine having a radiator, said method comprising:
providing a large recirculating flow of a cooling fluid at an initial stage of said engine warm-up through said engine in a first circuit including a branch line going through said aftercooler;
providing a limited supply of cooling fluid through said radiator in a second circuit for mixing thereof with said first circuit fluid prior to an entry to said aftercooler in the final stage of said engine warm-up;
providing a coolest fluid flow to said aftercooler by a self-adjusting gradual shift of an interflow of said first circuit to said second circuit fluid flow until a complete shut off of said first circuit in response to an engine temperature rise;
providing said limited supply of fluid through a valve by-pass line with a predetermined sizing;
providing such shut-off by a valve located on a line connecting said radiator to a pump.

2. A self-adjusting cooling system for cooling air passing through an aftercooler into an internal combustion engine, said system comprising:
a first coolant circuit for circulating the cooling fluid through said engine and including a pump for generating a flow through said engine;
said first circuit comprising a branch coolant line passing through said aftercooler;
a second coolant circuit passing through a radiator and coupleable with said first circuit under predetermined conditions;
control means for automatic re-routing of a limited fluid flow from said first circuit into said second coolant circuit using a valve by-pass line upstream of said radiator and gradual mixing the fluid from said circuits until a complete shut off of said first circuit in response to a temperature rise in said first circuit;
said control means comprising a mixing valve means for directing the fluid in said circuit with the lowest temperature under all operating conditions into said aftercooler for cooling an air flow passing therethrough and regardless of temperature of fluid leaving said aftercooler;

said pump being fed by a mixture of fluids from said first circuit and downstream side of said aftercooler.

3. The invention according to claim 2, and said control means comprising a first thermally controlled valve means permitting an incremental increase of said limited fluid flow for responding to predetermined temperature levels;

said first thermally controlled valve means comprising a valve by-pass line admitting selected minimal flow into said second circuit prior to said first valve means actuation by a temperature rise in said second circuit and continuing to admit said fluid thereafter.

4. The invention according to claim 3, and said first valve means permitting a first circuit flow to pass through said valve by-pass line when fluid temperature reaches approximately 120° F.

5. The invention according to claim 2, and said control means comprising a second thermally controlled valve means for re-circulating a selected amount of cooling fluid through both circuits and self-actuated at a predetermined temperature;

a radiator discharge line splitting into two lines leading respectively to said mixing valve means and said second valve means.

6. The invention according to claim 5, and said second thermally controlled valve means being located upstream of said mixing valve means and downstream of said radiator.

7. The invention according to claim 2, and said first circuit comprising an engine cooler discharge line diverging into separate lines leading respectively to said first and said second valve means.

8. A cooling system for an internal combustion engine with a radiator and aftercooler for cooling an air supply to the engine and comprising:

a first coolant circuit excluding said radiator and providing a large recirculating flow of cooling fluid through said engine;

a second cooland circuit providing a smaller re-circulating flow through said radiator;

thermally controlled valve means sequentially and automatically self-engageable in response to an engine temperature rise for re-routing the cooling fluid with the lowest temperature in either of said circuits or a mixture thereof into said aftercooler and regardless of temperature of fluid leaving said aftercooler;

a first valve located upstream of said radiator and interposed on a communication line between said first circuit and said radiator for a multi-stage flow rate control in response to preset temperatures; and a first valve by-pass line conducting a low volume of fluid before and after said first valve opening for passing a larger fluid volume upon a temperature rise in said second circuit.

9. The invention according to claim 8, and said first valve permitting fluid in said first circuit to pass therethrough upon a fluid temperature rise above approximately 180° F.

10. The invention according to claim 8, and said valve means comprising a second valve disposed downstream of said first circuit and said radiator and capable of separating and combining fluid flow from said circuits at predetermined temperature levels;

said second valve passing first circuit fluid to said aftercooler between fluid temperatures of approximately 120° F. and 140° F.

11. The invention according to claim 8, and a third valve located at an intersection of said first circuit and a conduit disposed downstream of said radiator for guiding the fluid flow in said first circuit through said second circuit at selected temperatures;

said third valve shutting off said first circuit flow passing therethrough at approximately 200° F.

* * * * *